United States Patent
Bober et al.

(10) Patent No.: US 8,655,103 B2
(45) Date of Patent: Feb. 18, 2014

(54) DERIVING AN IMAGE REPRESENTATION USING FREQUENCY COMPONENTS OF A FREQUENCY REPRESENTATION

(75) Inventors: Miroslaw Bober, Guildford (GB); Paul Brasnett, Surbiton (GB)

(73) Assignee: Mitsubishi Electric Corporation, Tokyo (JP)

( * ) Notice: Subject to any disclaimer, the term of this patent is extended or adjusted under 35 U.S.C. 154(b) by 997 days.

(21) Appl. No.: 12/445,269

(22) PCT Filed: Oct. 11, 2007

(86) PCT No.: PCT/GB2007/003859
§ 371 (c)(1),
(2), (4) Date: May 29, 2009

(87) PCT Pub. No.: WO2008/044026
PCT Pub. Date: Apr. 17, 2008

(65) Prior Publication Data
US 2010/0008589 A1      Jan. 14, 2010

(30) Foreign Application Priority Data
Oct. 11, 2006   (EP) .................................... 06255239

(51) Int. Cl.
*G06K 9/36*   (2006.01)

(52) U.S. Cl.
USPC ........... 382/280; 382/115; 382/191; 382/281; 382/305; 382/294

(58) Field of Classification Search
USPC .................. 382/115, 191, 280, 281, 305, 294
See application file for complete search history.

(56) References Cited

U.S. PATENT DOCUMENTS

| | | | |
|---|---|---|---|
| 5,465,353 A | 11/1995 | Hull et al. | |
| 5,819,288 A | 10/1998 | De Bonet | |
| 5,852,823 A | 12/1998 | De Bonet | |
| 5,899,999 A | 5/1999 | De Bonet | |
| 6,072,904 A | 6/2000 | Desai et al. | |
| 6,421,463 B1* | 7/2002 | Poggio et al. | 382/224 |
| 6,671,407 B1 | 12/2003 | Venkatesan et al. | |
| 6,928,397 B1* | 8/2005 | Matsushiro | 703/2 |
| 7,076,659 B2* | 7/2006 | Cheng et al. | 713/176 |
| 2002/0028027 A1* | 3/2002 | Koyama | 382/289 |
| 2004/0103101 A1 | 5/2004 | Stubler et al. | |

(Continued)

FOREIGN PATENT DOCUMENTS

EP   1 498 848 A   1/2005

OTHER PUBLICATIONS

Kadyrov et al., The Trace Transform and Its Applications, IEEE Transactions on Pattern Analysis and Machine Intelligence, pp. 811-828, vol. 23, No. 8, Aug. 2001.*

(Continued)

*Primary Examiner* — Jayesh A Patel
(74) *Attorney, Agent, or Firm* — Birch, Stewart, Kolasch & Birch, LLP.

(57) ABSTRACT

A method of deriving a representation of an image by processing signals corresponding to the image, the method comprises deriving a function of the image, where a function of a translated, scaled or rotated version of the image is a translated or scaled version of the derived function of the image, and using a plurality of frequency components of a frequency representation of the function to derive a representation of the image.

18 Claims, 9 Drawing Sheets

(56) References Cited

U.S. PATENT DOCUMENTS

| | | | | |
|---|---|---|---|---|
| 2005/0111738 | A1* | 5/2005 | Iizuka | 382/190 |
| 2009/0316993 | A1* | 12/2009 | Brasnett et al. | 382/190 |
| 2010/0310153 | A1* | 12/2010 | Brasnett et al. | 382/154 |

OTHER PUBLICATIONS

Kadyrov et al., Affine parameter estimation from the trace transform, School of Electronics, Computers and Mathematics, pp. 798-801, 2002.*

Kadyrov et al., Object signatures invariant to affine distortions derived from the Trace transform, Image and Vision Computing, pp. 1135-1143, vol. 21, Aug. 2003.*

Petrou et al., Affine Invariant Features from the Trace Transform, IEEE Transactions on Pattern Analysis and Machine Intelligence, pp. 30-44, vol. 26, No. 1, Jan. 2004.*

Kadyrov et al., Affine Parameter Estimation from the Trace Transform, IEEE Transactions on Pattern Analysis and Machine Intelligence, pp. 1631-1645, vol. 28, No. 10, pubished online Aug. 11, 2006.*

Seo et al., A Robus Image Fingerprinting System Using the Radon Transform, Signal Processing: Image Communication, vol. 19, pp. 323-339, 2004.*

Brasnett et al., A Robust Visual Identifier Using the Trace Transform, Mitsubishi Electric ITE VIL, Jul. 2007, pp. 1-6.*

Fedotov et al., New Geometric Transform Based on Stochastic Geometry in the Context of Pattern Recognition, Springer-Verlag Berlin Heidelberg, 2003, pp. 148-155.*

Srisuk et al., A face authentication system using the trace transform, Pattern Analysis Application, vol. 8, 2005, pp. 50-61.*

Tabbone et al., "A New Shape Descriptor Defined on the Radon Transform" Computer Vision and Image Understanding, vol. 102, No. 1, Apr. 2006, pp. 42-51.

Petrou M et al., "Affine Invariant Features From the Trace Transform", IEEE Transactions on Pattern Analysis and Machine Intelligence, vol. 26, No. 1, Jan. 2004, pp. 30-44.

Kadyrov A et al., "The Trace Transform and Its Applications", IEEE Transactions on Pattern Analysis and Machine Intelligence, vol. 23, No. 8, Aug. 2001, pp. 811-828.

Turan Jan et al., "Trace Transform and KLT Based Invariant Features and Image Recognition System", Acta Electronica Et Informatica, vol. 6, No. 3, Mar. 2006, pp. 1-11.

Seo J S et al., "A Robust Image Fingerprinting System Using the Radon Transform", Signal Processing, vol. 19, No. 4, Apr. 2004, pp. 325-339.

Kadyrov A., et al. "Korean character recognition with the Trace transform", Proceedings of the International Conference on Itegration of Multimedia Cointents; Nov. 15, 2001; pp. 1-14; XP002624900.

Alejandro Jaimes, Shih-Fu Chang and Alexander C. Loui, "Detection of Non-Identical Duplicate Consumer Photographs", ICICS-PCM 2003, pp. 16-20, Dec. 15-18, 2003.

Edward Y. Chang, James Ze Wang, Chen Li and Gio Wiederhold, "RIME: A Replicated Image Detector for the World-Wide Web", Proc. of SPIE Symp. of Voice, Video, and Data Comms., pp. 58-67, Boston, MA, Nov. 1998.

F. Lefebvre, J. Czyz and B. Macq, "A Robust Soft Hash Algorithm for Digital Image Signature", Proc. IEEE Int. Conf. Image Processing, pp. 495-498, 2003.

H.Chi Wong, Marshall Bern and David Goldberg, "An Image Signature for any Kind of Image", Proc. ICIP 2002, pp. 409-412, 2002.

R. Venkatesan, S.-M. Koon, M.H. Jakubowski and P. Moulin, "Robust Image Hashing", Proc. IEEE ICIP 2000, pp. 664-666, Sep. 2000.

Vishal Monga and Brian L. Evans, "Robust Perceptual Image Hashing using Feature Points", Proc. IEEE ICIP 2004, pp. 677-680, Oct. 2004.

\* cited by examiner

DERIVING AN IMAGE REPRESENTATION USING FREQUENCY COMPONENTS OF A FREQUENCY REPRESENTATION

The present invention relates to a method and apparatus for representing an image, and a method and apparatus for comparing or matching images, for example, for searching or validation.

Large numbers of image databases exist and it is often necessary to find copies of a specific image or its modified versions. Such functionality may be required for example for rights management or for search purposes. The same image placed on different web-sites can indicate similar content and thus provides valuable search clues. Another important application is identification and linking between "film" photographs and negatives and other digital archives.

Hashing algorithms such as MD5 can be used to detect identical images. A hash function generates a value based on the content; if two images are identical they will have the same hash value. However, traditional approaches such as MD5 are bit-sensitive, meaning that a change of just one bit will lead to a completely different hash value. Typically, images will undergo some form of alteration for example compression and therefore traditional hashing methods will fail.

One common image processing approach to detecting duplicate images is to attempt to align image pairs and then find the difference between the common areas. The problem with this is that the alignment process is computationally complex, making searching prohibitively time consuming for large databases. Each time a new query image is presented a full alignment and matching process needs to be carried out with each entry in the database. A further significant drawback is that the original image must be available (or transmitted) to allow the searching.

Figure 2:
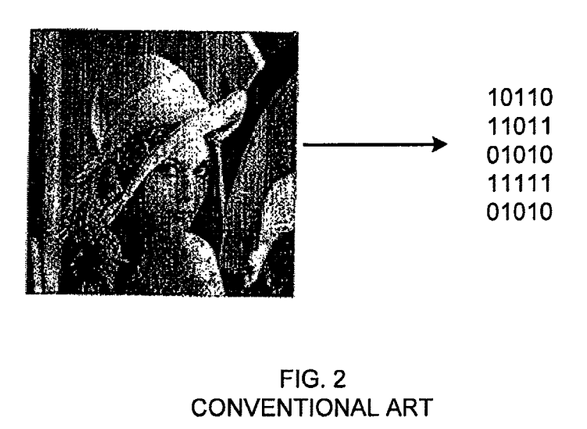
FIG. 2 shows an image and a bit string representation of the image according to the prior art.

An alternative approach involves extracting a compact identifier that captures the features of the image. The advantage of such a process is that the identifier needs to be extracted once only and then stored. Therefore if the matching process is efficient this method offers fast search performance. The image identifier is typically a bit string that represents the image (see FIG. 2).

Image identifiers can be based on colour or greyscale distributions. In H. Chi Wong, Marshall Bern and David Goldberg, "An Image Signature for any Kind of hnage", Proc. ICIP 2002, pp. 409-412, 2002 [reference 1], an m×n grid of points is used to define locations at which features are to be extracted. The features are based on the intensity difference between the grey levels of the pixel and its 8-neighbouring pixels. The feature vector is therefore of size 8 mn. Comparisons between pairs of feature vectors are carried out using a normalised $L_2$ distance measure. The distance measure is based on the sum of absolute difference between the histograms. Results presented suggest that this approach works quite accurately for resizing and compression but not for rotation.

The claims made in U.S. Pat. No. 6,671,407 [reference 14] are based on the work in R. Venkatesan, S.-M. Koon, M. H. Jakubowski and P. Moulin, "Robust Image Hashing", Proc. IEEE ICIP 2000, pp. 664-666, September, 2000 [reference 2]. The hash function is generated for the purpose of storing the image in a database and for generating a watermark to embed in the image. The hash function is generated by performing a wavelet transform on the input image. Each sub-band is split up into randomly sized blocks and the statistics (mean or variance) of each block are calculated. The statistics are then quantised to eight-levels, the quantisation provides some robustness to modifications. The quantised values are then represented by a 3-bit binary string.

The previous two methods rely on splitting the input image up in to rectangular regions. Therefore they will all be unsuccessful under moderate amounts of image rotation.

As an alternative to colour and greyscale distributions frequency domain information is sometimes used for image identifiers. An approach based on the discrete wavelet transform (DWT) is described in Edward Y. Chang, James Ze Wang, Chen Li and Gio Wiederhold, "RIME: A Replicated Image Detector for the World Wide Web", Proc. of SPIE Symp. of Voice, Video, and Data Comms., pp. 58-67, Boston, Mass., November, 1998 [reference 3] using the Daubechies filter. The sub regions at the lowest level of the wavelet transform are used to represent the image. A DWT based method is reference 2 supra, the DCT component of the DWT is found and then an iterative, deterministic region growing method is used to form a binary version of the original image. This method is not robust to significant amounts of rotation.

An image hash function is developed in F. Lefebvre, J. Czyz and B. Macq, "A Robust Soft Hash Algorithm for Digital Image Signature", Proc. IEEE Int. Conf. Image Processing, pp. 495-498, 2003 [reference 4] that is based on the Radon transform. The hash function is developed for the purposes of watermarking, however it is designed to have some very useful properties such as robustness to rotation, scaling, compression, filtering and blurring. Following the Radon transform the covariance matrix is calculated and the signature is formed from the eigenvectors corresponding to the two largest eigenvalues.

The Radon transform of an image is used to form an image identifier in Jin S. Seo, Jaap Haitsma, Ton Kalker and Chang D. Yoo, "A Robust Image Fingerprinting System using the Radon Transform", Signal Processing: Image Communication, 19, pp. 325-339, 2004 [reference 5]. After the Radon transform is taken a number of steps are taken including, auto-correlation, log-mapping and 2D Fourier transform. From this a 2D binary identifier is extracted. This method is not robust to left-right image flip.

The final alternative to identifier extraction is the use of image features. An approach that uses a wavelet transform for feature point detection and extraction is proposed in Vishal Monga and Brian Evans, "Robust Perceptual Image Hashing using Feature Points", Proc. IEEE ICIP 2004, pp. 677-680, October, 2004 [reference 6]. The detected features are used to construct an image signature. The method lacks robustness to rotation.

In Alejandro Jaimes, Shih-Fu Chang and Alexander C. Loui, "Detection of Non-Identical Duplicate Consumer Photographs", ICICS-PCM 2003, pp. 16-20, December, 2003 [reference 7] interest points are detected and the RANSAC algorithm is used for global image alignment. The similarity match score is derived from correlation and self-saliency maps.

US-A-2004/0103101 [reference 8] is concerned with solving the problem of detecting geometrically transformed copies of images. It is based on detecting matching objects and features between two images. Once matches have been found between the images the geometric transform is calculated, the two images are aligned and the difference is calculated as a map of similarity between the images.

In general the search and matching processes used for feature point detection based methods are computationally demanding and are therefore not suitable for use on large databases or where processing power is limited.

An edge-based image retrieval system is disclosed in U.S. Pat. No. 6,072,904, [reference 9]. A characteristic vector based on the edge features in an image is formed for each image and retrieval is performed by comparison of these vectors.

A scheme that generates hash values based upon image features is disclosed in U.S. Pat. No. 5,465,353 [reference 10]. For each image a set of local feature points are extracted. A set of hash triples are formed from the features and the image is stored in a database. A voting scheme is described which allows retrieval of the document that has the most matching features to a query image. The voting scheme used makes the searching computationally demanding.

In the method presented in U.S. Pat. No. 5,819,288 [reference 11], U.S. Pat. No. 5,852,823 [reference 12] and U.S. Pat. No. 5,899,999 [reference 13], the features come from multi-resolution (3 levels) processing with a set of predefined Gaussian derivatives (25 filters). This leads to 15,625 ($25^3$) features for each colour channel i.e. 46,875 features. A set of images can be grouped together for storage and/or query by calculating the statistics (mean and variance) of the features over all the images. The storage requirements used by this method are very high.

An image feature extraction method is proposed in Maria Petrou and Alexander Kadyrov, "Affine Invariant Features from the Trace Transform", IEEE Trans. on PAMI, 26 (1), January, 2004, pp 30-44 [reference 16] that is based on the trace transform. Combinations of functionals are used to obtain a feature vector of (7×6×14) 588 numbers. This approach is computationally expensive as it requires the trace transform to be performed many times for each image to obtain all 588 numbers in the feature vector.

The main problems with the existing algorithms and systems are that:
  they are computationally expensive in terms of feature extraction and/or matching,
  the descriptors require excessive storage space,
  they lack robustness to image modifications,
  the false acceptance rate is too high for effective use on large datasets.

Aspects of the invention are set out in the accompanying claims.

The present invention offers efficient feature extraction and very simple, fast matching. The identifier is also very compact; typically being not more than 128 bits (16 bytes), therefore 64 image identifiers can be stored in 1 KB and 65,536 identifiers stored in 1 MB. The best known prior art method requires 400 bits per image. False acceptance rates for the invention are of the order of 1 part per million.

The present invention concerns a new method for extracting an identifier from an image. The robust identifier is obtained by a method that, in an embodiment, combines the use of the Trace transform and a binary coefficient encoding based on the magnitude of the Fourier transform. The binary encoding method uses the Fourier transform of the circus function (of the Trace transform) to extract a binary identifier.

The Trace transform consists of tracing an image with straight lines along which a certain functional T of the image intensity or colour function is calculated. Different trace functionals T may be used to produce different Trace transforms from single input image. Since in the 2D plane a line can be characterised by two parameters (d,θ), a Trace transform of the 2D image is a 2D function of the parameters (d,θ) of each tracing line.

Next, the "circus function" is computed by applying a diametric functional P along the columns (in the Trace domain) of the Trace transform (i.e. the diametrical functional P is applied over distance parameter d to obtain a 1D circus function in terms of the angle θ).

In accordance with the present invention, a frequency representation of the circus function is obtained (e.g. a Fourier transform) and a function is defined on the frequency amplitude components and its sign is taken as a binary descriptor.

Another aspect of the method combines selected fragments from a 'family' of identifiers obtained by using different functional combinations into a single descriptor. The performance of identifiers is greatly increased by using such combinations.

Embodiments of the invention will be described with reference to the accompanying drawings of which:
FIG. 1a shows an image;
FIG. 1b shows a reduced version of the image of FIG. 1a;
FIG. 1c shows a rotated version of the image of FIG. 1a;
FIG. 1d shows a blurred version of the image of FIG. 1a.

Various embodiments for deriving a representation of an image, and for using such a representation, for example, for identification, matching or validation of an image or images, will be described below. The invention is especially useful for identifying an image, as discussed above, but is not limited to image identification. Similarly, an image identifier, as described in the embodiments, is an example of an image representation, or descriptor.

The specific design of a visual identifier according to an embodiment of the invention is determined by the requirements related to the type of image modifications it should be robust to, the size of the identifier, extraction and matching complexity, target false-alarm rate, etc.

Here we show a generic design that results in an identifier that is robust to the following modifications to an image:
  Colour reduction,
  Blurring,
  Brightness Change,
  Flip (left-right & top-bottom),
  Greyscale Conversion,
  Histogram Equalisation,
  JPEG Compression,
  Noise,
  Rotation and
  Scaling.

The identifier should preferably achieve a very low false-alarm rate of 1 part per million on a broad class of images.

Figure 1:
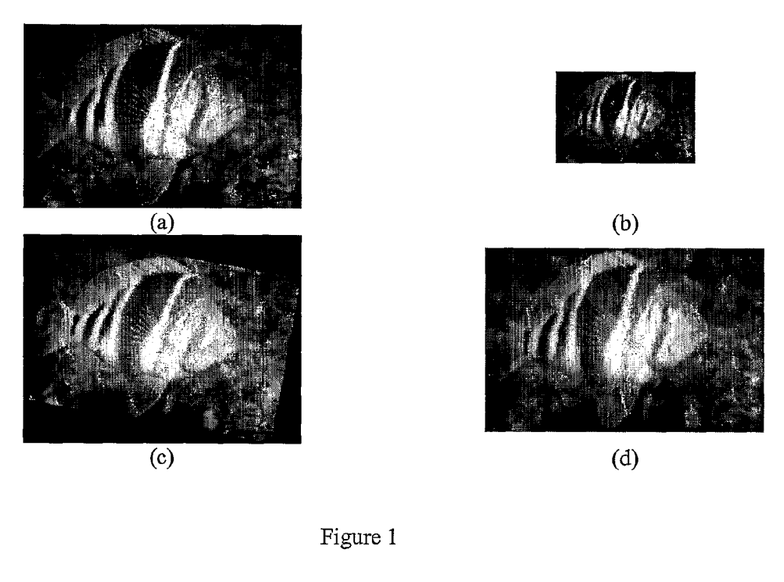

FIG. 1 shows an example of an image and modified versions of the image. More specifically, FIG. 1a is an original image, FIG. 1b is a reduced version of the image of FIG. 1a, FIG. 1c is a rotated version of the image of FIG. 1a, and FIG. 1d is a blurred version of the image of FIG. 1a.

The embodiment of the invention derives a representation of an image, and more specifically, an image identifier, by processing signals corresponding to the image.

Figure 3:
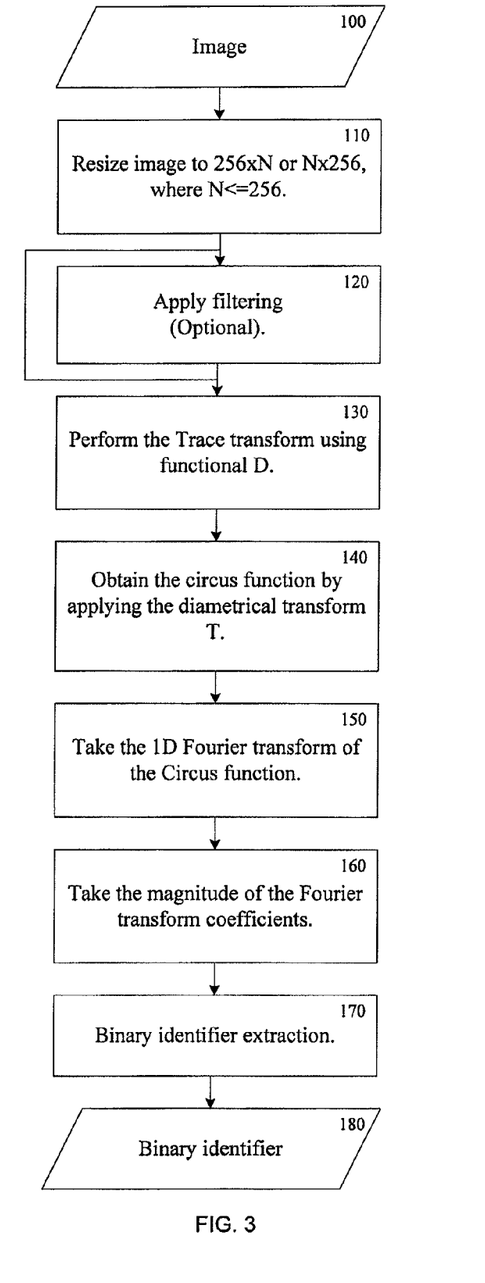
FIG. 3 is a diagram illustrating steps of a method of an embodiment of the invention.

FIG. 3 shows steps of a method of deriving an image identifier according to an embodiment of the invention, that is, an identifier extraction process.

Prior to applying a trace transform, the image is pre-processed by resizing (step 110) and optionally filtering (step 120). The resizing step 110 is used to normalise the images before processing. The step 120 can comprise of filtering to remove effects such as aliasing caused by any processing performed on the image and/or region selection rather than using the full original image. In the preferred embodiment of the method a circular region is extracted from the centre of the image for further processing.

In step 130, a trace transform T(d,θ) is performed. The trace transform 130 projects all possible lines over an image and applies functionals over these lines. A functional is a real-valued function on a vector space V, usually of functions.

Figure 5:
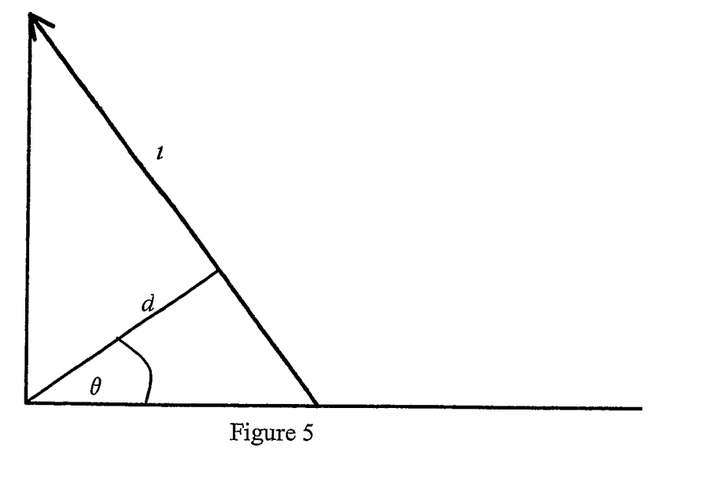
FIG. 5 is a diagram illustrating the line parameterisation for the trace transform.

In the case of the Trace transform a trace functional T is applied over lines in the image. As shown in FIG. 5, a line is parameterised by d and θ. A further functional D can then be applied in step 140 to the columns of the trace transform (i.e. along the distance parameter d) to give a vector of real numbers. This second functional P is known as the diametrical functional and the resulting vector (a 1D function in terms of θ) is known as the circus function. A third functional, the circus functional, can be applied to the circus function to give a single number. The properties of the result can be controlled by appropriate choices of the three different functionals (trace, diametrical and circus). Full details of the Trace transform, including examples of images and corresponding Trace transforms, can be found, for example, in Alexander Kadyrov and Maria Petrou, "The Trace Transform and Its Applications", IEEE Trans. PAMI, 23 (8), August, 2001, pp 811-828 [reference 15] which is incorporated herein by reference.

In the method of the embodiment of the present invention, only the first two steps are taken in the Trace transform, i.e. the Trace transform is applied followed by the diametrical functional to obtain the 1D circus function.

In one particular example of the method the trace functional T is given by $$\int \xi(t) dt, \qquad (1)$$

and the diametrical functional P is given by $$\max(\xi(t)). \qquad (2)$$

Figure 6:
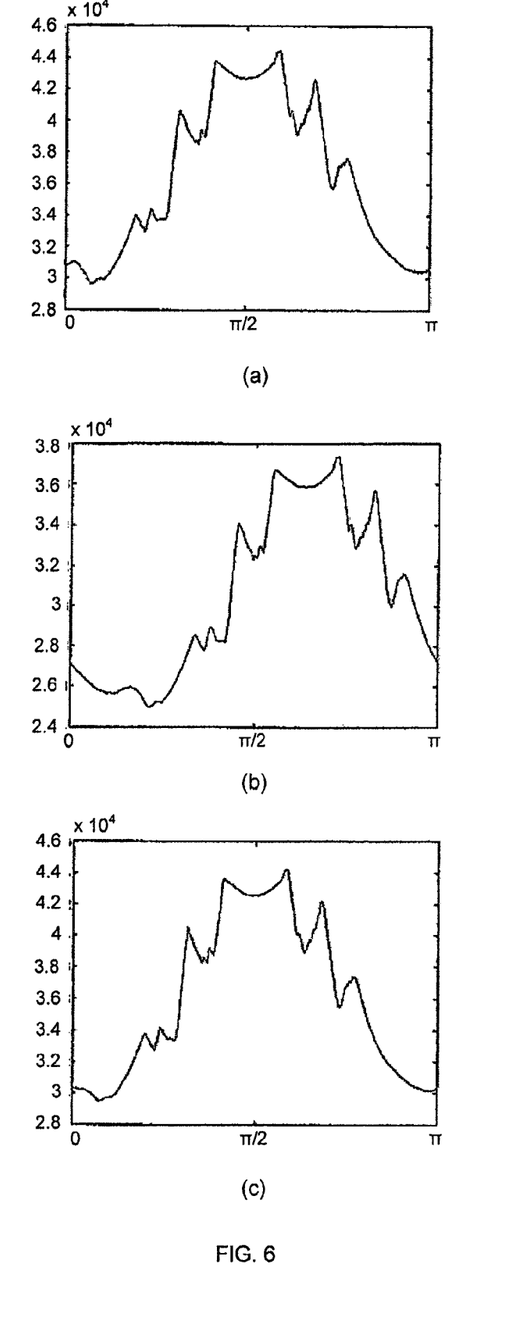
FIGS. 6a-c illustrate functions derived from different versions of an image.

Examples of how the circus function is affected by different image processing operations can be seen in FIG. 6, which shows the circus function corresponding to different versions of an image. FIG. 6(*a*) corresponds to an original image; FIG. 6(*b*) corresponds to a rotated version of the image and FIG. 6(*c*) corresponds to a blurred version of the image. It can be seen that rotation shifts the function (as well as causing a scale change).

For all image modification operations listed above it can be shown that with a suitable choice of functionals the circus function $f(a)$ of image a is only ever a shifted or scaled (in amplitude) version of the circus function $f(a')$ of the modified image a' (see Section 3 of reference 15).

$$f(a') = \kappa f(a - \theta). \qquad (3)$$

Now, by taking the Fourier transform of equation (3) we get $$F(\Phi) = F[\kappa f(a - \theta)], \qquad (4)$$

$$= \kappa F[f(a - \theta)], \qquad (5)$$

$$= \kappa \exp^{-j\theta\Phi} F[f(a)]. \qquad (6)$$

Then taking the magnitude of equation (6) gives $$|F(\Phi)| = |\kappa F[f(a)]|. \qquad (7)$$

From equation (7) we can see that the modified image and original image are now equivalent except for the scaling factor κ.

According to the embodiment, a function $c(\omega)$ is now defined on the magnitude coefficients of a plurality of Fourier transform coefficients. One illustration of this function is taking the difference of neighbouring coefficients $$c(\omega) = |F(\omega)| - |F(\omega+1)| \qquad (8)$$

A binary string can be extracted by applying a threshold to the resulting vector of equation (8) such that $$b_\omega = \begin{cases} 0, & c(\omega) < 0 \\ 1, & c(\omega) >= 0 \end{cases} \text{ for all } \omega, \qquad (9)$$

The image identifier of the embodiment of the present invention is then made up of these values $B = \{b_0, \ldots, b_n\}$.

To perform identifier matching between two different identifiers $B_1$ and $B_2$, both of length N, the normalised Hamming distance is taken $$H(B_1, B_2) = \frac{1}{N} \sum_N B_1 \otimes B_2, \qquad (10)$$

where $\otimes$ is the exclusive OR (XOR) operator. Other methods of comparing identifiers or representations can be used.

The performance is further improved by selection of certain bits in the identifier. The lower bits are generally more robust and the higher bits are more discriminating. In one particular embodiment of the invention the first bit is ignored and then the identifier is made up of the next 64 bits.

Figure 7:
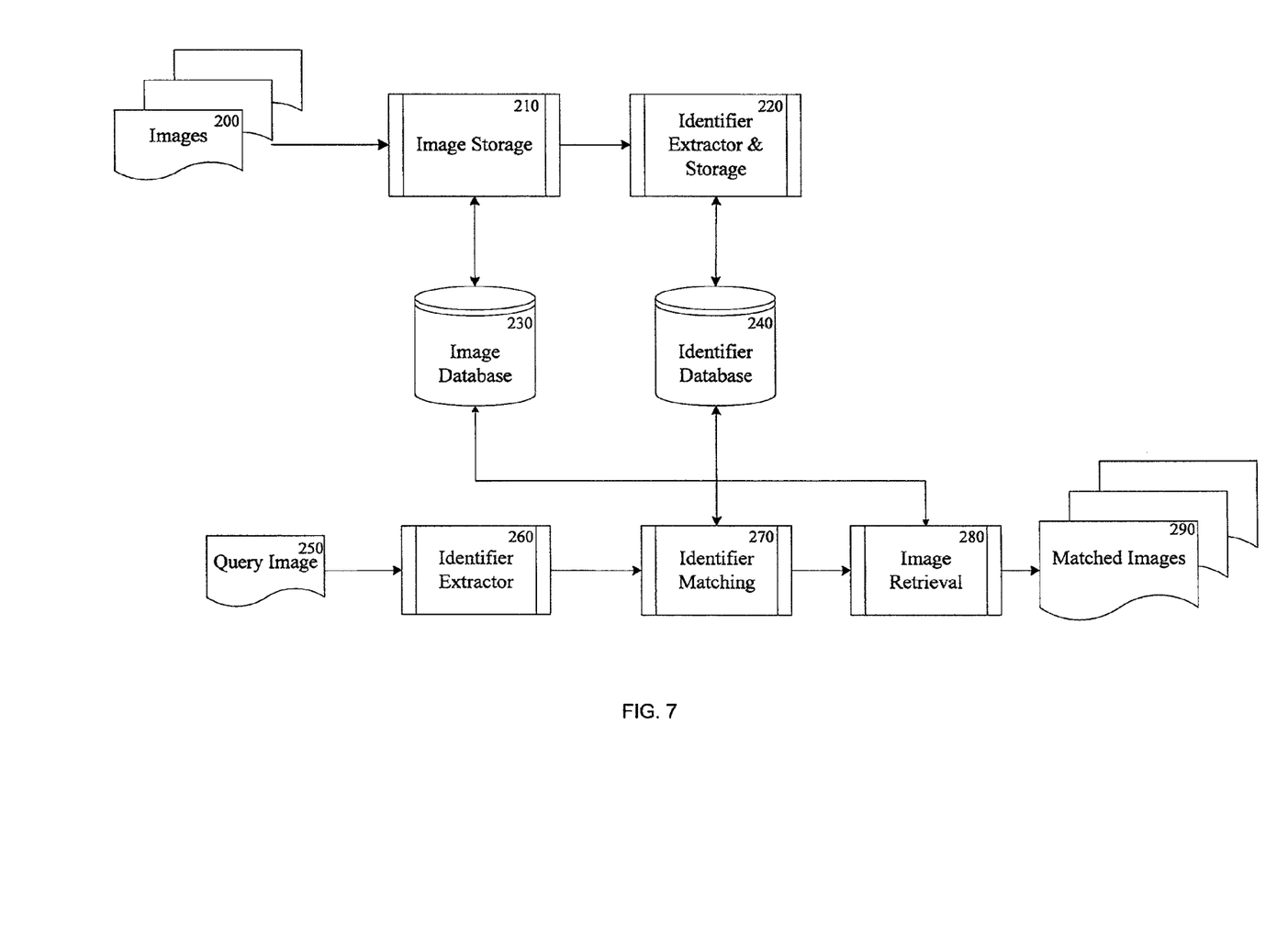
FIG. 7 is a block diagram of an apparatus according to an embodiment of the invention.

An example of an apparatus according to an embodiment of the invention for carrying out the above methods is shown in FIG. 7. Specifically, images 200 are received by image storage module 210 and stored in image database 230. In addition, identifier extractor and storage module 220 extracts an image identifier for each received image, in accordance with the method of the present invention, and stores the image identifiers in identifier database 240, optionally together with other information relevant to image contents, as appropriate.

FIG. 7 additionally shows an apparatus embodying an image search engine that uses the image identifiers extracted using the above methods. Image verification or matching may be performed by an image search engine in response to receiving a query image 250. An image identifier for the query image 250 is extracted in identifier extractor module 260, in accordance with the method of the present invention. Identifier matching module 270 compares the image identifier for the query image 250 with the image identifiers stored in identifier database 240. Image retrieval module 280 retrieves matched images 290 from image database 230, the matched images 290 having the image identifiers matching the query image identifier, as discussed in more detail below.

Figure 4:
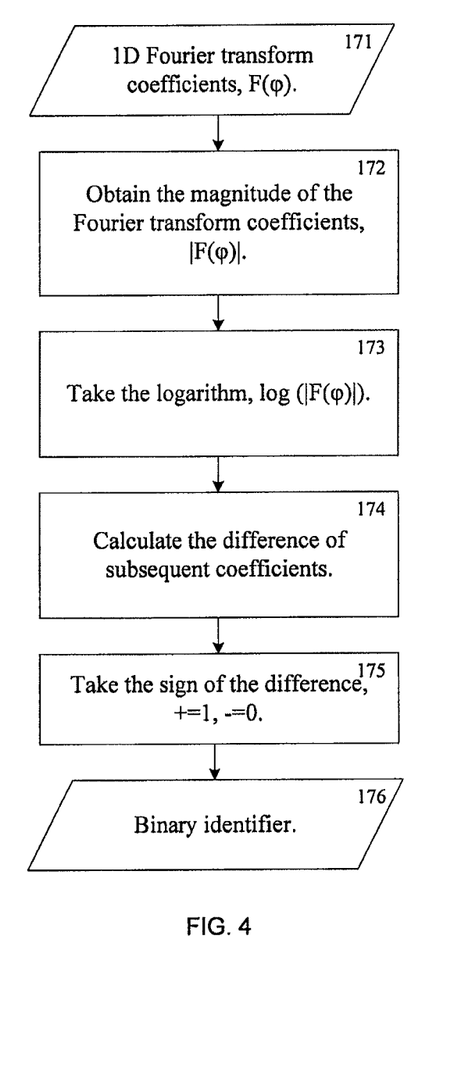
FIG. 4 is a diagram illustrating steps of another method of an embodiment of the invention.

FIG. 4 shows an alternative method of defining a binary function on Fourier transform coefficients. In particular, after obtaining Fourier transform coefficients (step 171), the logarithm of the magnitude of a plurality of Fourier transform coefficients is obtained (steps 172 and 173). The difference of subsequent coefficients is calculated (step 174) similar to equation (8) above, followed by taking the sign of the difference and assigning binary values according to the sign (step 175), which are then used to form the binary identifier.

Figure 8:
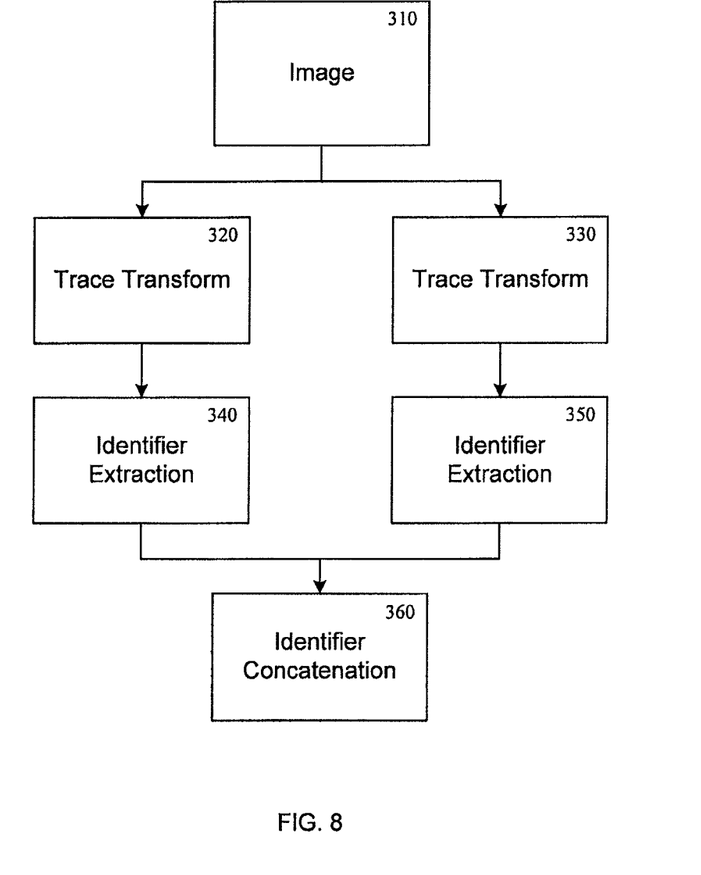
FIG. 8 is a block diagram illustrating an embodiment using multiple trace transforms.
Figure 9:
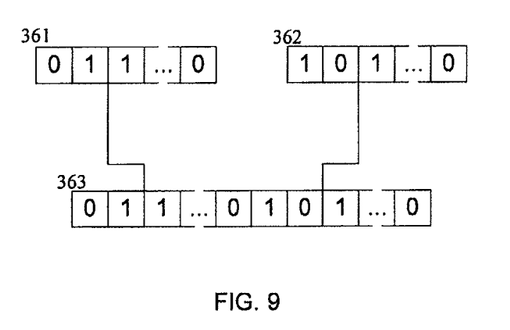
FIG. 9 illustrates bit stream produced according to the embodiment of FIG. 8.

The basic identifier described previously can be improved by using multiple trace transforms and combining bits from the separate transforms as shown in FIGS. 8 and 9. The specific method for combining binary strings from two separate transforms 361 and 362 is to concatenate them to obtain the identifier 363. Good results have been obtained in this way by using the Trace functional T in equation (1) with the diametrical functional P given by equation (2) for one binary string and then Trace functional T of equation (1) with the diametrical functional P:

$$\int |\xi(t)'| dt, \tag{11}$$

to obtain the second string. The first bit of each binary string is skipped and then the subsequent 64 bits from both strings are concatenated to obtain a 128 bit identifier.

One application of the identifier is as an image search engine, such as shown in FIG. 7 and described above. A database 240 is constructed by extracting and storing the binary identifier of an image along with associated information such as the filename, the image, photographer, date and time of capture, and any other useful information. Then given a query image aq the binary identifier is extracted and is compared with all identifiers in the database $B_0 \ldots B_M$. All images with a Hamming distance to the query image below a threshold are returned.

A range of different trace T and diametrical D functionals can be used, for example (a non-exhaustive list):

$$\int \xi(t) dt, \tag{A1}$$

$$\left( \int |\xi(t)|^q dt \right)^r, \quad \text{where } q > 0 \tag{A2}$$

$$\int |\xi(t)'| dt, \tag{A3}$$

$$\int (t - X1)^2 \xi(t) dt, \quad \text{where } X1 = \frac{\int t\xi(t) dt}{A1} \tag{A4}$$

$$\sqrt{\frac{A4}{A1}}, \tag{A5}$$

$$\max(\xi(t)), \tag{A6}$$

$$A6 - \min(\xi(t)). \tag{A7}$$

Two or more identifiers can be combined to better characterise an image. The combination is preferably carried out by concatenation of the multiple identifiers.

For geometric transformations of higher order than rotation, translation and scaling the version of the identifier described above is not appropriate; the relationship in equation (3) does not hold. The robustness of the identifier can be extended to affine transformations using a normalisation process full details of which can be found in reference 16 supra. Two steps are introduced to normalise the circus function, the first involves finding the so called associated circus then second step involves finding the normalised associated circus function. Following this normalisation it is shown that the relationship in (3) is true. The identifier extraction process can now continue as before.

Some suitable trace functionals for use with the normalisation process are given below in (G1) & (G2), a suitable choice for the diametrical functional is given in (G3).

$$T(g(t)) = \int_{R^+} rg(r) dr, \tag{G1}$$

$$T(g(t)) = \int_{R^+} r^2 g(r) dr, \tag{G2}$$

$$P(h(t)) = \sum_k |h(t_{k+1}) - h(t_k)|, \tag{G3}$$

where $r \equiv t-c$, $c \equiv \text{median}(\{t_k\}_k, \{|g(t_k)|\}_k)$. The weighted median of a sequence $y_1, y_2, \ldots, y_n$ with nonnegative weights $w_1, w_2, \ldots, w_n$ is defined by identifying the maximal index m for which $$\sum_{k<m} w_k \leq \frac{1}{2} \sum_{k \leq n} w_k \tag{12}$$

assuming that the sequence is sorted in ascending order according to the weights. If the inequality (in equation 12) is strict the median is $y_m$. However, if the inequality is an equality then the median is $(y_m + y_{m-1})/2$.

Rather than constructing the identifier from a continuous block of bits the selection can be carried out by experimentation. One example of how to do this is to have two sets of data i) independent images ii) original and modified images. The performance of the identifier can be measured by comparing the false acceptance rate for the independent data and false rejection rate for the original and modified images. Points of interest are the equal error rate or the false rejection rate at a false acceptance rate of $1 \times 10^{-6}$. The optimisation starts off with no bits selected. It is possible to examine each bit one at a time to see which bit gives the best performance (say in terms of the equal error rate or some similar measure). The bit that gives the best result is now selected. Next all the remaining bits may be tested to find which gives the best performance in combination with the first bit. Again, the bit with the lowest error rate is selected. This procedure is repeated until all bits are selected. It is then possible to choose the bit combination that results in the overall best performance.

A structure could be applied to the identifier to improve search performance. For example a two pass search could be implemented, half of the bits are used for an initial search and then only those with a given level of accuracy are accepted for the second pass of the search.

The identifier can be compressed to further reduce its size using a method such as Reed-Muller decoder or Wyner-Ziv decoder.

The identifier can also be used to index the frames in a video sequence. Given a new sequence identifiers can be extracted from the frames and then searching can be performed to find the same sequence. This could be useful for copyright detection and sequence identification.

Multiple broadcasters often transmit the same content, for example advertisements or stock news footage. The identifier can be used to form links between the content for navigation between broadcasters.

Image identifiers provide the opportunity to link content through images. If a user is interested in a particular image on a web page then there is currently no effective way of finding other pages with the same image. The identifier could be used to provide a navigation route between images.

The identifier can be used to detect adverts in broadcast feeds. This can be used to provide automated monitoring for advertisers to track their campaigns.

There are many image databases in existence, from large commercial sets to small collections on a personal computer. Unless the databases are tightly controlled there will usually be duplicates of images in the sets, which requires unnecessary extra storage. The identifier can be used as a tool for removing or linking duplicate images in these datasets.

In this specification, the term "image" is used to describe an image unit, including after processing, such as filtering, changing resolution, upsampling, downsampling, but the term also applies to other similar terminology such as frame, field, picture, or sub-units or regions of an image, frame etc. In the specification, the term image means a whole image or a region of an image, except where apparent from the context. Similarly, a region of an image can mean the whole image. An image includes a frame or a field, and relates to a still image or an image in a sequence of images such as a film or video, or in a related group of images. The image may be a greyscale or colour image, or another type of multi-spectral image, for example, IR, UV or other electromagnetic image, or an acoustic image etc.

In the embodiments, a frequency representation is derived using a Fourier transform, but a frequency representation can also be derived using other techniques such as a Haar transform. In the claims, the term Fourier transform is intended to cover variants such as DFT and FFT.

The invention is preferably implemented by processing electrical signals using a suitable apparatus.

The invention can be implemented for example in a computer system, with suitable software and/or hardware modifications. For example, the invention can be implemented using a computer or similar having control or processing means such as a processor or control device, data storage means, including image storage means, such as memory, magnetic storage, CD, DVD etc, data output means such as a display or monitor or printer, data input means such as a keyboard, and image input means such as a scanner, or any combination of such components together with additional components. Aspects of the invention can be provided in software and/or hardware form, or in an application-specific apparatus or application-specific modules can be provided, such as chips. Components of a system in an apparatus according to an embodiment of the invention may be provided remotely from other components, for example, over the internet.

As the skilled person will appreciate, many variations and modifications may be made to the described embodiments. it is intended to include all such variations, modification and equivalents that fall within the spirit and scope of the present invention, as defined in the accompanying claims.

The invention claimed is:

1. A method of deriving a representation of an image by processing signals corresponding to the image, the method comprising:
    deriving, using a processor, a 1-dimensional function of the image, wherein said function is a circus function or a function derived from a circus function, where a function of a translated, scaled, or rotated version of the image is a translated or scaled version of the derived function of the image,
    deriving, using said processor, a plurality of frequency coefficients of a frequency representation of the derived function, and
    deriving, using said processor, a representation function of the image using the frequency coefficients, wherein the representation function is obtained using the steps of:
    calculating, using said processor, the magnitude of the frequency coefficients, and
    determining, using said processor, a difference between the magnitude of each frequency coefficient and its subsequent frequency coefficient using the equation $c(\omega)=|F(\omega)|-|F(\omega+1)|$, and comparing $c(\omega)$ with a threshold to derive $b_\omega$, where $|F(\omega)|,|F(\omega+1)|$ are the magnitudes of the frequency coefficients and $b_\omega$ are the values in a binary string.

2. The method of claim 1 wherein the frequency components are determined using a Fourier transform or a Haar transform.

3. A method of deriving a representation of an image by processing signals corresponding to the image, the method comprising:
    deriving, using a processor, a 1-dimensional function of the image, wherein said function is a circus function or a function derived from a circus function, where a function of a translated, scaled, or rotated version of the image is a translated or scaled version of the derived function of the image,
    deriving, using said processor, a plurality of frequency coefficients of a frequency representation of the derived function, and
    deriving, using said processor, a representation function of the image using the frequency coefficients, wherein the representation function is obtained using the steps of:
    calculating, using said processor, a logarithm of the magnitude of the frequency coefficients, and
    determining, using said processor, a difference between the logarithm of the magnitude of each frequency coefficient and its subsequent frequency coefficient using the equation $c(\omega)=\log|F(\omega)|-\log|F(\omega+1)|$, and comparing $c(\omega)$ with a threshold to derive $b_\omega$, where $|F(\omega)|,|F(\omega+1)|$ are the magnitudes of the frequency coefficients and $b_\omega$ are the values in a binary string.

4. The method of claim 1, further comprising:
    deriving the binary string $b_\omega$ by applying a threshold to each determined difference to derive a series of binary values, wherein applying the threshold provides a binary value of 0 if a said determined difference is less than zero, and a binary value of 1 if a said difference is greater than or equal to zero.

5. The method of claim 1, further comprising:
    deriving two or more representation functions using two or more respective circus functions, and combining said two or more representation functions.

6. The method of claim 5 wherein combining said two or more representation functions comprises concatenating said two or more representation functions.

7. The method of claim 1 further comprising deriving a representation having n digits or bits, further comprising selecting a subset of m digits or bits.

8. The method of claim 1 wherein the derived function is derived using one or more of the following functions:

$$\int \xi(t)dt,$$

$$\left(\int |\xi(t)|^q dt\right)^r, \quad \text{where } q > 0$$

$$\int |\xi(t)'|dt,$$

$$\int (t-X1)^2 \xi(t)dt, \quad \text{where } X1 = \frac{\int t\xi(t)dt}{\int \xi(t)dt}$$

-continued $$\sqrt{\frac{\int (t-X1)^2 \xi(t)dt}{\int \xi(t)dt}},$$

$\max(\xi(t))$, and $\max(\xi(t)) - \min(\xi(t))$.

9. The method of claim 1 further comprising normalising the derived function before determining frequency components.

10. The method of claim 9 further comprising deriving an associated circus function or a normalised circus function.

11. The method of claim 10 using one or more of the following functions:

$$T(g(t)) = \int_{R^+} rg(r)dr,$$

$$T(g(t)) = \int_{R^+} r^2 g(r)dr, \text{ and}$$

$$P(h(t)) = \sum_k |h(t_{k+1}) - h(t_k)|,$$

where $T(g(t))$ is a trace functional, $P(h(t))$ is a diametrical functional, $r \equiv t-c, c \equiv \text{median}(\{t_k\}_k, \{|g(t_k)|\}_k)$.

12. A method of identifying an image comprising:
deriving, using a processor, a representation of an image using the method of claim 1; and
associating, using said processor, the representation with the image.

13. A method of comparing images comprising:
comparing, using a processor, representations of each image derived using the method of claim 1, wherein the comparison comprises:
determining a Hamming distance using the equation $$H(B_1, B_2) = \frac{1}{N} \sum_N B_1 \otimes B_2,$$

where $\otimes$ is the exclusive OR (XOR) operator, N is the length, and B1 and B2 are two different representations both of length N.

14. The method of claim 13 further comprising selecting images based on the comparison of representations.

15. An apparatus for deriving a representation of an image by processing signals corresponding to the image comprising:
a memory; and
a processor configured to execute the method of claim 1.

16. The apparatus of claim 15 further comprising a control device for controlling operation of the said processor configured to carry out the method.

17. The apparatus of claim 16 further comprising:
one or more databases for storing images or representations of images;
a display, and
an image selector.

18. A non-transitory computer readable medium having stored thereon instructions for executing the method of claim 1.

* * * * *